US009121863B2

(12) United States Patent
Hawkinson et al.

(10) Patent No.: US 9,121,863 B2
(45) Date of Patent: Sep. 1, 2015

(54) SYSTEMS AND METHODS FOR A LIMB STRIKE DETECTOR

(71) Applicant: Honeywell International Inc., Morristown, NJ (US)

(72) Inventors: Wesley J. Hawkinson, Chanhassen, MN (US); Paul Samanant, Eden Prairie, MN (US); Michael Ray Elgersma, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 189 days.

(21) Appl. No.: 14/031,081

(22) Filed: Sep. 19, 2013

(65) Prior Publication Data
US 2015/0081213 A1 Mar. 19, 2015

(51) Int. Cl.
*G01C 21/20* (2006.01)
*G01C 22/00* (2006.01)
*G01P 15/00* (2006.01)
*G01C 21/16* (2006.01)

(52) U.S. Cl.
CPC ............... *G01P 15/00* (2013.01); *G01C 21/20* (2013.01); *G01C 22/006* (2013.01); *G01C 21/16* (2013.01)

(58) Field of Classification Search
CPC ...... G01C 21/16; G01C 21/20; G01C 22/006; G01P 15/00
USPC .......................................................... 701/504
See application file for complete search history.

(56) References Cited

U.S. PATENT DOCUMENTS

| | | | |
|---|---|---|---|
| 5,583,776 A | 12/1996 | Levi et al. | |
| 6,813,582 B2 | 11/2004 | Levi et al. | |
| 7,561,960 B2 | 7/2009 | Soehren | |
| 7,653,508 B1 | 1/2010 | Kahn et al. | |
| 2003/0018430 A1 | 1/2003 | Ladetto et al. | |
| 2007/0208544 A1 | 9/2007 | Kulach et al. | |
| 2008/0133171 A1* | 6/2008 | Feichtinger et al. | 702/141 |
| 2011/0035185 A1 | 2/2011 | Habel et al. | |

(Continued)

OTHER PUBLICATIONS

Noh, Yun-Hong, and Do-Un Jeong. "An Improved Calculation Method for Activity Energy Expenditure by Using PNS." International Journal of Software Engineering and Its Applications 7.1 (2013): 33-44.*

(Continued)

*Primary Examiner* — John Q Nguyen
*Assistant Examiner* — Anshul Sood
(74) *Attorney, Agent, or Firm* — Fogg & Powers LLC

(57) ABSTRACT

Systems and methods for a limb strike detector are provided. In certain embodiments, a system for detecting limb strikes comprises an inertial measurement unit (IMU) that provides inertial measurements; and a processing unit that receives the inertial measurements from the IMU. In certain embodiments, computer readable instructions direct the processing unit to determine multiple local vertical acceleration samples, wherein each local vertical acceleration sample in the multiple local vertical acceleration samples defines an acceleration component along the local vertical axis and an associated time; integrate the multiple local vertical acceleration samples to determine multiple local vertical velocity samples; identify limb strike regions from the multiple local vertical velocity samples, wherein a limb strike region is associated with a local vertical velocity sample in the plurality of local vertical velocity samples; and determine limb strike times based on the identified limb strike regions and the multiple local vertical acceleration samples.

18 Claims, 5 Drawing Sheets

(56) References Cited

U.S. PATENT DOCUMENTS

| | | |
|---|---|---|
| 2012/0089330 A1 | 4/2012 | Hesch et al. |
| 2012/0136573 A1 | 5/2012 | Janardhanan et al. |
| 2013/0190657 A1* | 7/2013 | Flaction et al. .............. 600/595 |

OTHER PUBLICATIONS

European Patent Office, "Office Action from EP Application No. 14183299.8 mailed Feb. 23, 2015", "from Foreign Counterpart of U.S. Appl. No. 14/031,081", Feb. 23, 2015, pp. 1-4, Published in: EP.

Libby, "A simple method for reliable footstep detection on embedded sensor platforms", Jun. 25, 2008, pp. 1-16.

Soehren, Wayne and Wes Hawkinson, "Prototype Personal Navigation System", "IEEE A&E Systems Magazine; Based on Presentation at PLANS 2006", Apr. 2008, pp. 10-18, Publisher: IEEE.

Svensson et al., "Stair gait classification from kinematic sensors", "Rehabilitation Robotics", Aug. 2007, pp. 1-14, Publisher: I-Tech Education and Publishing.

Ying et al., "Automatic Step Detection in the Accelerometer Signal", "4th International Workshop on Wearable and Implantable Body Sensor Networks", 2007, pp. 1-6, vol. 13, Publisher: Springer Berlin Heidelberg.

* cited by examiner

SYSTEMS AND METHODS FOR A LIMB STRIKE DETECTOR

BACKGROUND

Global positioning systems may be used for tracking the location of humans. However, in certain environments, GPS signals may be unavailable for tracking human location. Where knowing the location of humans is important, such as in industrial safety, mining, underground maintenance, first responders, soldiers, and even shoppers within a mall and GPS is unavailable, personal navigation devices that provide user location have been developed. Many of these devices function through implementing the dead reckoning technique, where dead reckoning involves projecting a displacement onto a heading that is provided by a compass or gyro. To measure displacement, personal navigation systems may use human motion characteristics. For example, some systems may measure displacement by detecting and counting steps, such as pedometers, while other systems may differentiate between locomotion modes (such as walking, running, crawling, and the like) and then determine the step length based on a motion model that relates one or more measures of activity to displacement. These above described system rely on accurate methods of counting limb strikes (such as steps), and motion model based systems, in particular, rely on the precise measurement of a time of limb strike (such as a footfall) to be used as an input to the motion model. However, in some systems, misidentified steps may significantly contribute to measurement errors, thus, precise measurement of the number and time of limb strikes is important for high precision displacement calculations.

In certain personal navigation systems, pattern matching is used to discriminate between various motion types. Essentially, a measured inertial sensor signal pattern is matched to one of many pre-recorded patterns, where the pre-recorded patterns are associated with different motion types. However, for the different motion types, many different patterns need to be recorded to accommodate different sensor mounting locations and different human postures. Also, if start points of the measured and recorded patterns do not coincide, lengthy and computation intensive correlation processes are used to synchronize the patterns.

SUMMARY

Systems and methods for a limb strike detector are provided. In certain embodiments, a system for detecting limb strikes comprises an inertial measurement unit configured to provide inertial measurements; and a processing unit configured to receive the inertial measurements from the inertial measurement unit. In certain embodiments computer readable instructions direct the processing unit to determine a plurality of local vertical acceleration samples from the inertial measurements, wherein each local vertical acceleration sample in the plurality of local vertical acceleration samples defines a component of acceleration along the local vertical axis and an associated time; integrate the plurality of local vertical acceleration samples to determine a plurality of local vertical velocity samples; identify limb strike regions where limb strikes occur from the plurality of local vertical velocity samples, wherein a limb strike region is associated with at least one local vertical velocity sample in the plurality of local vertical velocity samples; and determine limb strike times based on the identified limb strike regions and the plurality of local vertical acceleration samples.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
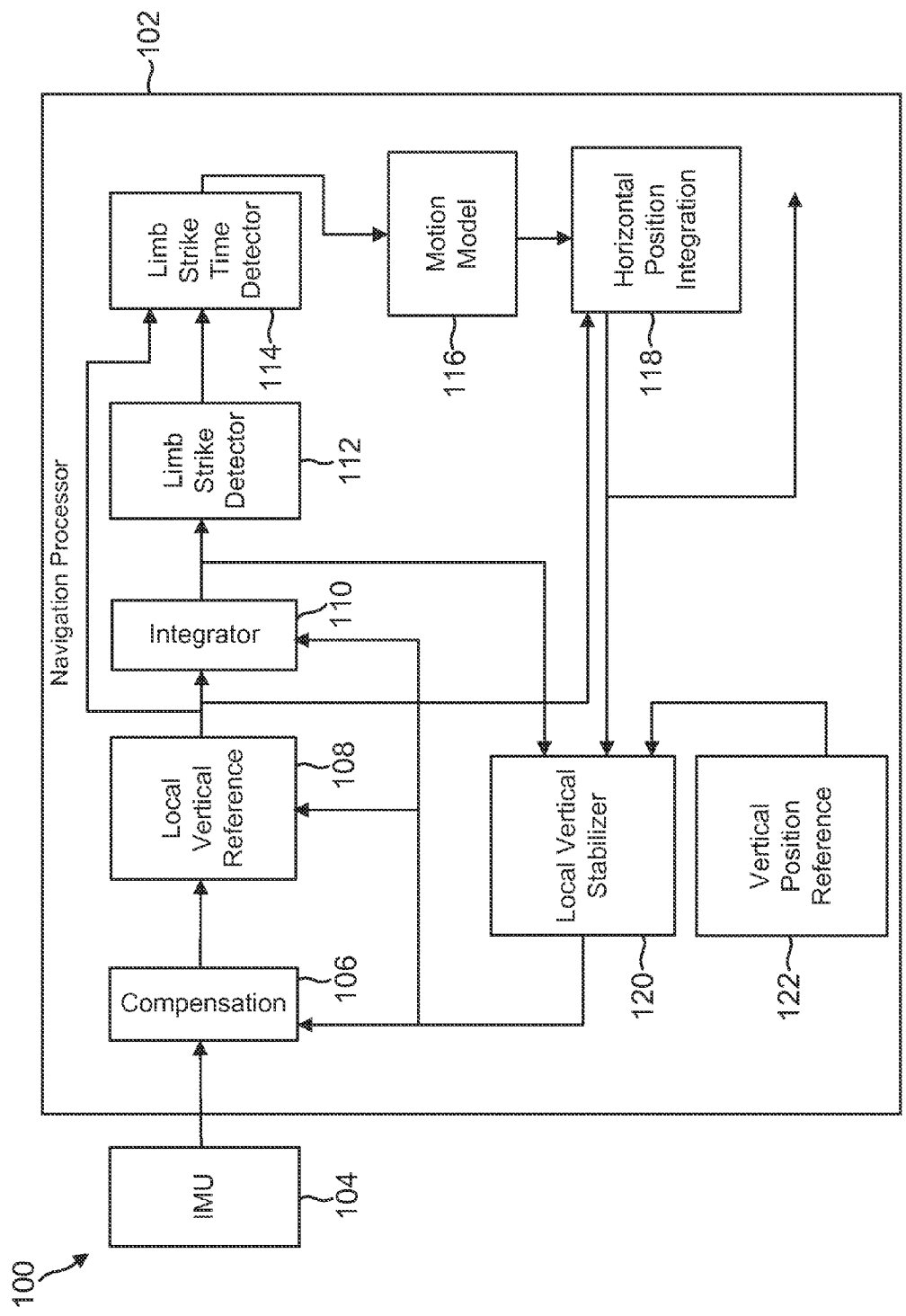
FIG. 1 is a block diagram of a navigation system that detects limb strikes in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Systems and methods for a limb strike detector are herein provided. For example, a provided method increases the reliability of the step detector and increases the accuracy of detecting limb strike times. Likewise, the accurate detection of limb strikes increases the accuracy of results produced by motion models and reduces the computation time required for pattern matching by providing a precise pattern synchronization point. To detect limb strikes, a system space stabilizes acceleration signals from an inertial measurement unit (IMU) by transforming the acceleration signals to a local vertical reference frame. Once transformed to the local vertical frame, the accelerations are integrated to form a vertical velocity, where a sliding window threshold detector is applied to detect a local minimum vertical velocity. The minimum vertical velocity corresponds to the maximum rise or fall of the gait, which is near the time of the footfall. The raw acceleration data near the step detection threshold crossing time is then examined for a crossing over the average local value for gravitational acceleration. It is likely that the crossing point will not be exactly coincident with a sample time, thus, for certain sample sets of data, the crossing time may be inferred by interpolating between the acceleration samples that are on either side of the threshold.

FIG. 1 is a block diagram of a navigation system 100 that calculates changes in the horizontal position of a user based on a limb strike against a surface over which the user is traveling. The navigation system 100 includes a navigation processor 102 and an inertial measurement (IMU) 104. The IMU 104 includes a set of gyroscopes and accelerometers that provide inertial measurements about six degrees of freedom. For example, an IMU 104 may have three gyroscopes where each gyroscope provides rotation measurements about one of three orthogonal axes. Also, the IMU 104 may have three accelerometers that provide acceleration measurements about three orthogonal axes. In at least one implementation, the IMU 104 provides the inertial measurements to a navigation processor 102. Further, when a user is a human, the IMU 104 provides inertial measurements of human motion.

In certain implementations, the navigation processor 102 samples the information received from the IMU 104 and executes instructions that direct the navigation processor 102 to provide a horizontal position based on the inertial measurements and previously calculated position data. As illustrated in FIG. 1, the navigation processor 102 performs multiple functions to determine the horizontal position of a user. The different functions performed by the navigation processor 102 are described in greater detail below. Further, the navigation processor 102 may be implemented through digital computer systems, microprocessors, general purpose computers, programmable controllers and field programmable gate arrays (FPGAs) or application-specific integrated circuits (ASICs). The navigation processor 102 executes program instructions that are resident on computer readable media which when executed by the navigation processor 102 cause the navigation processor 102 to implement embodiments described in the present disclosure. Computer readable media include any form of a physical computer memory storage device. Examples of such a physical computer memory device include, but is not limited to, punch cards, magnetic disks or tapes, optical data storage systems, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Upon reception of the inertial measurements, the navigation processor 102 performs compensation function 106. During the operation of the IMU 104, small errors may arise in the measurements provided by the IMU. Over time, the small errors in the inertial measurements may accumulate and cause a drift in the accuracy of computations based on the inertial measurements. The compensation 106 adjusts the measurements received from the IMU 104 to compensate for errors that have developed over the course of operation of the IMU 104. The compensation 106 then provides the compensated inertial measurements to the local vertical reference 108.

Figure 2:
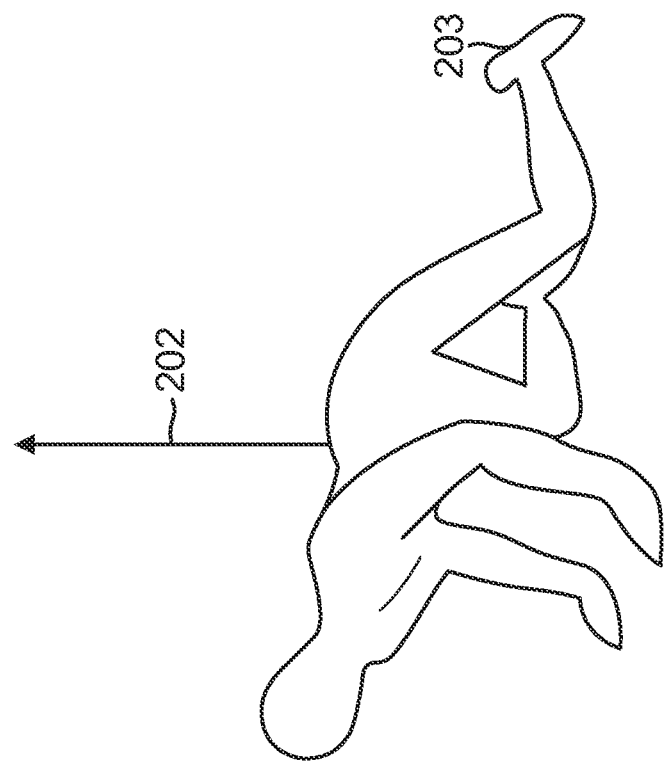
FIG. 2 is a diagram illustrating the identification of a local vertical axis for different body orientations and gaits in one embodiment described in the present disclosure.
Figure 2:
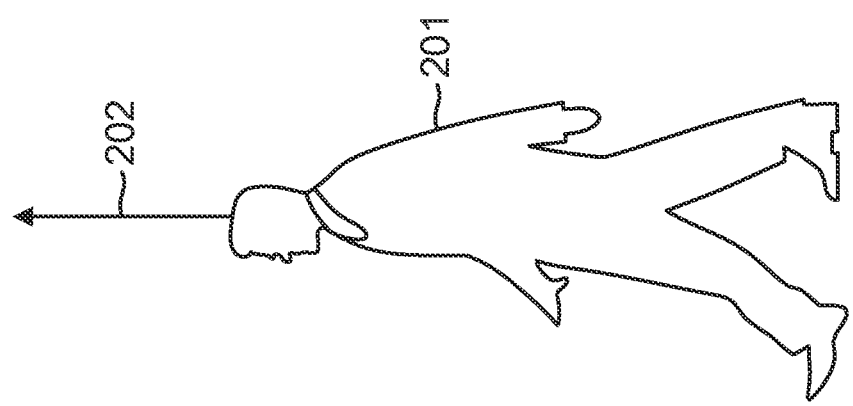

The navigation processor 102 performs the local vertical reference 108 by transforming compensated acceleration signals to a local vertical reference frame. Local vertical reference 108 transforms acceleration signals into the local vertical frame by creating a signal that is insensitive to mounting and posture variations. For example, the local vertical reference 108 determines the acceleration of the navigation system user along the vertical direction in relation to the ground. For example, when the user is a human using a personal navigation system, the human subject may assume various levels of upper body tilt that depend on activity, load, situation or motion type. For example, FIG. 2 illustrates the determination of the local vertical reference direction 202 for humans moving according to different motion types. In one situation, a human may be walking 201. When the human is walking, the local vertical reference 108 determines the local vertical acceleration along the local vertical axis 202. Similarly, where a human is crawling 203, the local vertical reference 108 determines the local vertical acceleration along the local vertical axis 202.

When the local vertical reference 108 determines the acceleration along the local vertical axis, the local vertical reference 108 passes the calculated acceleration to an integrator 110, a step time detector 114, and a horizontal position integration 118. When the integrator 110 receives the local vertical acceleration, the integrator 110 integrates the received local vertical acceleration to determine the local velocity of the user along the vertical axis. The integration performed by the integrator 110 is done as is generally understood by one having skill in the art. The integrator 110 then provides the velocity data to a limb strike detector 112 and a local vertical stabilizer 120. The limb strike detector 112 determines if a limb strike occurred. Also, the limb strike detector 112 determines if a detected limb strike is the result of valid data provided by the IMU 104.

In certain implementations, the limb strike detector 112 detects whether a limb strike occurs when the local velocity is less than an average local velocity of a sliding window of sample data. In particular, the limb strike detector 112 calculates the average local velocity over a sliding window comprising a finite number of the most recently received data samples from the integrator 110. For example, the limb strike detector 112 calculates the average local velocity over the most recently received 25 samples of data. When a local velocity sample within the sliding window is less than the average local velocity, the limb strike detector 112 determines that a limb strike occurred.

Figure 3A:
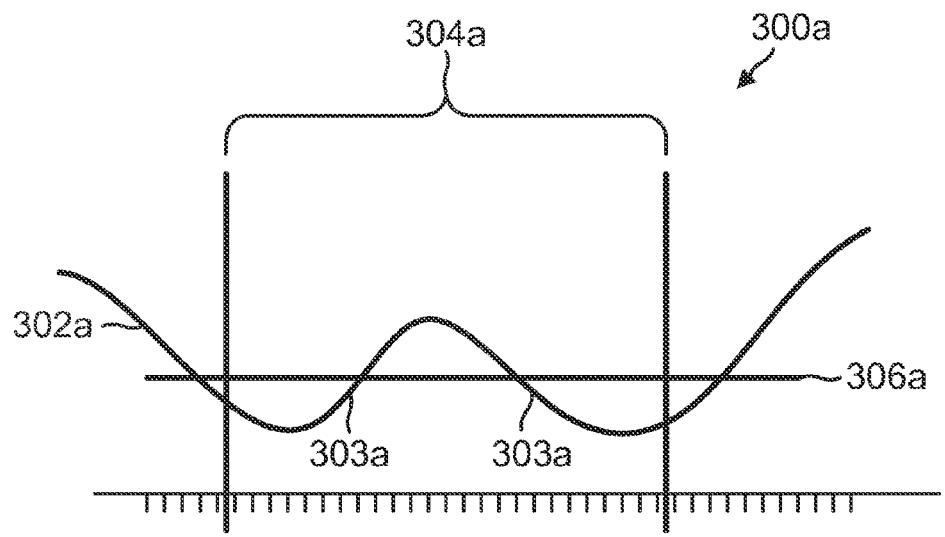
FIGS. 3A and 3B illustrate the identification of limb strike regions in one embodiment described in the present disclosure.

FIG. 3A is a graph 300a illustrating the identification of limb strikes from local velocity data 302a by a limb strike detector 112. As shown, the local velocity data 302a increases and decreases in accordance with the motion of the user of the navigation system 100. To determine whether a limb strike occurred, the limb strike detector 112 calculates the average velocity 306a over a sliding window 304a. In at least one example, the sliding window bases calculation of the average velocity 306 on 25 samples of local velocity data. In one implementation, the sliding window 304a is identified as containing the most recently received samples from the integrator 110. Alternatively, the local velocity data 302a identified within the sliding window 304a may include a section of previously received data that is stored in memory. When the samples of the local velocity data 302a that are within the sliding window 304a are identified, the limb strike detector 112 calculates the average velocity 306a from the samples of the local velocity data 302a that are within the sliding window 304a. The limb strike detector 112 then determines when a limb strike occurred by identifying when the local velocity data 302a is less than the average velocity 306a. The limb strike detector 112 identifies the regions of data that are less than the average velocity 306a as limb strike regions 303a. In certain implementations, when the limb strike detector 112 detects the limb strikes and identifies the limb strike regions 303a, the limb strike detector 112 passes information regarding the limb strike regions 303a to the limb strike time detector 114.

In certain embodiments, the limb strike detector 112 performs a reasonable test on the local level velocity data received from the integrator 110. The reasonable test is performed to determine that the user of the navigation system 100 was moving. For example, when a user is not performing any locomotion, the IMU may still provide changing local level velocity data due to noise, breathing, non-locomotive motion, and the like. As the local level velocity data is changing, the limb strike detector 112 may identify false limb strike regions 303*b* that exceed the average local level velocity over a sliding window of data. However, changes in the local velocity data that are not caused by locomotive motion will be small in comparison to changes that are caused by locomotive motion. Thus, to prevent the limb strike regions from identifying false limb strike regions, the limb strike detector 112 uses a velocity range threshold. To use the velocity range threshold, the limb strike detector 112 calculates a velocity difference between the maximum local level velocity and the minimum local level velocity in the sliding window of data and compares the difference against the velocity range threshold. If the velocity difference exceeds the velocity range threshold, then local velocity data that is less than the average velocity data is detected as limb strike regions. In contrast, if the velocity difference is less than the velocity range threshold, then local velocity data that exceeds the average velocity data are ignored. For example, if the velocity difference is less than the velocity range threshold, then the limb strike detector 112 does not calculate the average velocity data for the particular sliding window of velocity data. In at least one implementation, the velocity range threshold is determined in part by the gait of the user. For example, when the user is crawling, the velocity range threshold may be smaller than when the user is running.

Figure 3B:
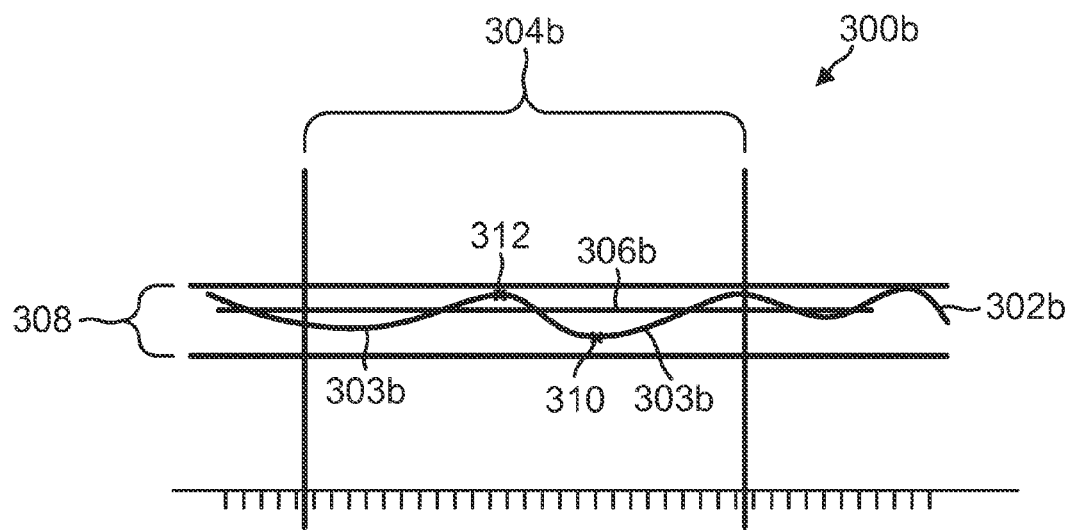

FIG. 3B is a graph 300*b* illustrating the comparison of local velocity data 302*b* against a velocity range threshold 308. As illustrated, over the sliding window 304*b*, limb strike detector 112 may calculate average velocity 306*b* for the local velocity data 302*b* over the sliding window 304*b* as described above in relation to FIG. 3A. Further, the limb strike detector 112 may identify limb strike regions 303*b* from the local velocity data 302*b* substantially as described above in relation to FIG. 3A. However, limb strike detector 112 may also identify the maximum local velocity data sample 310 and the minimum local velocity data sample 312 within the sliding window 304*b*. Further, the limb strike detector 112 calculates the difference between the maximum local velocity data sample 310 and the minimum local velocity data sample 312. If the difference is greater than the velocity range threshold 308, then the limb strike detector 112 sends data describing the limb strike regions 303*b* to the limb strike time detector 114. However, if the difference is less than the velocity range threshold 308, then the limb strike detector 112 either does not send the identified limb strike regions 303*b* to the limb strike time detector 114 or does not identify the limb strike regions 303*b*.

In certain exemplary embodiments and as described above, when the limb strike detector 112 identifies limb strike regions within the sliding window, the limb strike detector 112 passes data representing the limb strike regions to the limb strike time detector 114. Also, the limb strike time detector 114 receives data representing the local vertical acceleration from the local vertical reference 108. In certain embodiments, the limb strike time detector 114 uses the limb strike region data and local vertical acceleration data to identify the time that a limb strike occurred. To identify the time that the limb strike occurred, the limb strike time detector 114 identifies the data samples in the local vertical acceleration that fall within the time associated with the limb strike region. The limb strike time detector 114 then fits a curve to the local vertical acceleration data that corresponds to the limb strike region data and identifies the point on the curve that crosses an acceleration threshold, such as gravitational acceleration, where the gravitational acceleration is the acceleration experienced by the user due to gravity (for example, ≈9.8 m/s² on Earth). In at least one example, the limb strike time detector 114 identifies the point where the local vertical acceleration equals the gravitational acceleration as the time that the limb strike occurred. The limb strike time detector 114 then passes the times that limb strikes occur to the motion model 116.

Figures 4A, 4B:
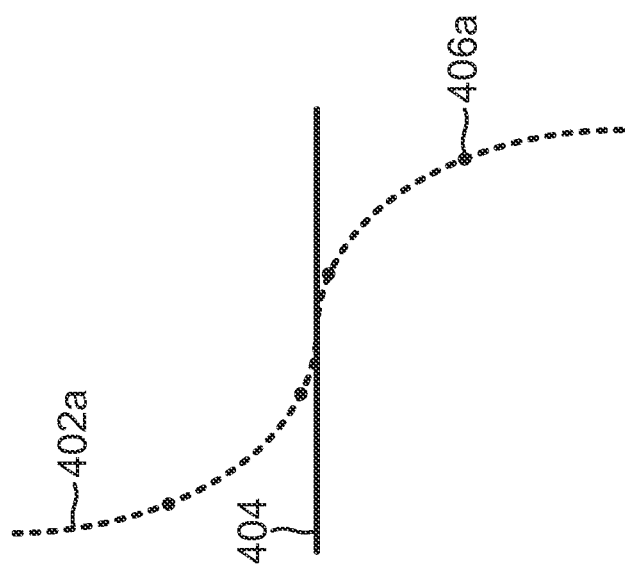
FIGS. 4A and 4B illustrate the identification of limb strike times in one embodiment described in the present disclosure.

FIGS. 4A and 4B are graphs of local vertical acceleration within a limb strike region that illustrate how a limb strike time detector 114 identifies the time of a limb strike. For example, FIG. 4A illustrates local vertical acceleration data 406*a* that is received from the local vertical reference 108. The limb strike time detector 114 fits a curve to the local vertical acceleration data 406*a*. For instance, the limb strike detector 114 interpolates between the data samples in the local vertical acceleration data 406*a* to create the continuous acceleration curve 402*a*. Methods of interpolation may include Lagrange polynomials, splines, Hermite interpolation, parametric curves, and other methods known to those having skill in the art. When the limb strike time detector 114 calculates the continuous acceleration curve, the limb strike time detector 114 determines the point on the continuous acceleration curve that equals gravitational acceleration 404. The limb strike time detector 114 determines that the moment when the continuous acceleration curve 402*a* substantially equals the gravitational acceleration 404 is the moment when the limb strike of the user occurs. As illustrated in FIG. 4B, occasionally, one of the samples in the local vertical acceleration data 406*b* will be substantially equal to the gravitational acceleration 404. When a sample in the local vertical acceleration data 406*b* is substantially equal to gravitational acceleration 404, the limb strike time detector 114 identifies the time of the sample as the moment when the limb strike of the user occurs. In at least one example, a sample is substantially equal to gravitational acceleration 404 when the sample is within 1% of the gravitational acceleration or when the difference between the gravitational acceleration 404 and the sample is less than a predefined threshold. As stated above, when the limb strike time detector 114 identifies the time when the limb strike occurs, the limb strike detector 114 passes a data representation of the time to the motion model 116.

The motion model 116 receives the time of the step from the limb strike time detector 114 and uses the time of the limb strike as an input for the motion model 116 when calculating the horizontal displacement of the user. Examples of different motion models that can be implemented as motion model 116 are described in co-pending U.S. patent application Ser. No. 12/900,315 entitled "SYSTEM AND METHOD FOR WAVELET-BASED GAIT CLASSIFICATION" filed on Oct. 7, 2010, herein incorporated in its entirety by reference; and in co-pending U.S. patent application Ser. No. 12/953,565 entitled "SYSTEM AND METHOD FOR CONSTRUCTING DISTANCE ESTIMATE MODELS FOR PERSONAL NAVIGATION" filed on Nov. 24, 2010, herein incorporated in its entirety by reference. The time of limb strike may also be used by other motion models known to those having skill in the art.

When the motion model 116 determines the horizontal displacement of the user, the motion model 116 passes the horizontal displacement of the user to horizontal position integration 118. The horizontal position integration 118 receives and integrates the horizontal displacement from the motion model 116. Further, the horizontal position integration 118 receives the heading from the local vertical reference 108. Based on the integrated horizontal displacement and the heading, the horizontal position integration 118 determines the horizontal position of the user. The horizontal position integration 118, then provides the horizontal position as an output of the navigation processor. Further, the horizontal position integration 118 provides the calculated horizontal position of the user to a local vertical stabilizer 120.

In at least one implementation, the navigation processor 102 also receives a vertical position reference 122, where the vertical position reference 122 provides the vertical position of the navigation system 100 within a frame of reference. For example, the vertical position of the navigation system 100 may be provided in altitude, elevation, and the like. In at least one implementation, the vertical position reference 122 provides the vertical position through a GPS, a barometric altimeter, and the like. When the navigation processor 102 receives the vertical position through the vertical position reference 122, the vertical position is passed to the local vertical stabilizer 120.

In certain embodiments, the local vertical stabilizer 120 receives the local velocity from the integrator 110, the horizontal position from the horizontal position integration 118, and the vertical position from the vertical position reference 122. The local vertical stabilizer 120 receives the inputs and calculates corrections for the data received from the IMU. For example, in at least one implementation, the local vertical stabilizer 120 functions as a Kalman filter. When the local vertical stabilizer 120 calculates the corrections, the local vertical stabilizer 120 provides the corrections to the compensation 106, the local vertical reference 108, and the integrator 110. Thus, the navigation processor 102 is able to more accurately provide navigational corrections for the data from the IMU 104 and thus provide a more accurate navigational solution as an output.

Figure 5:
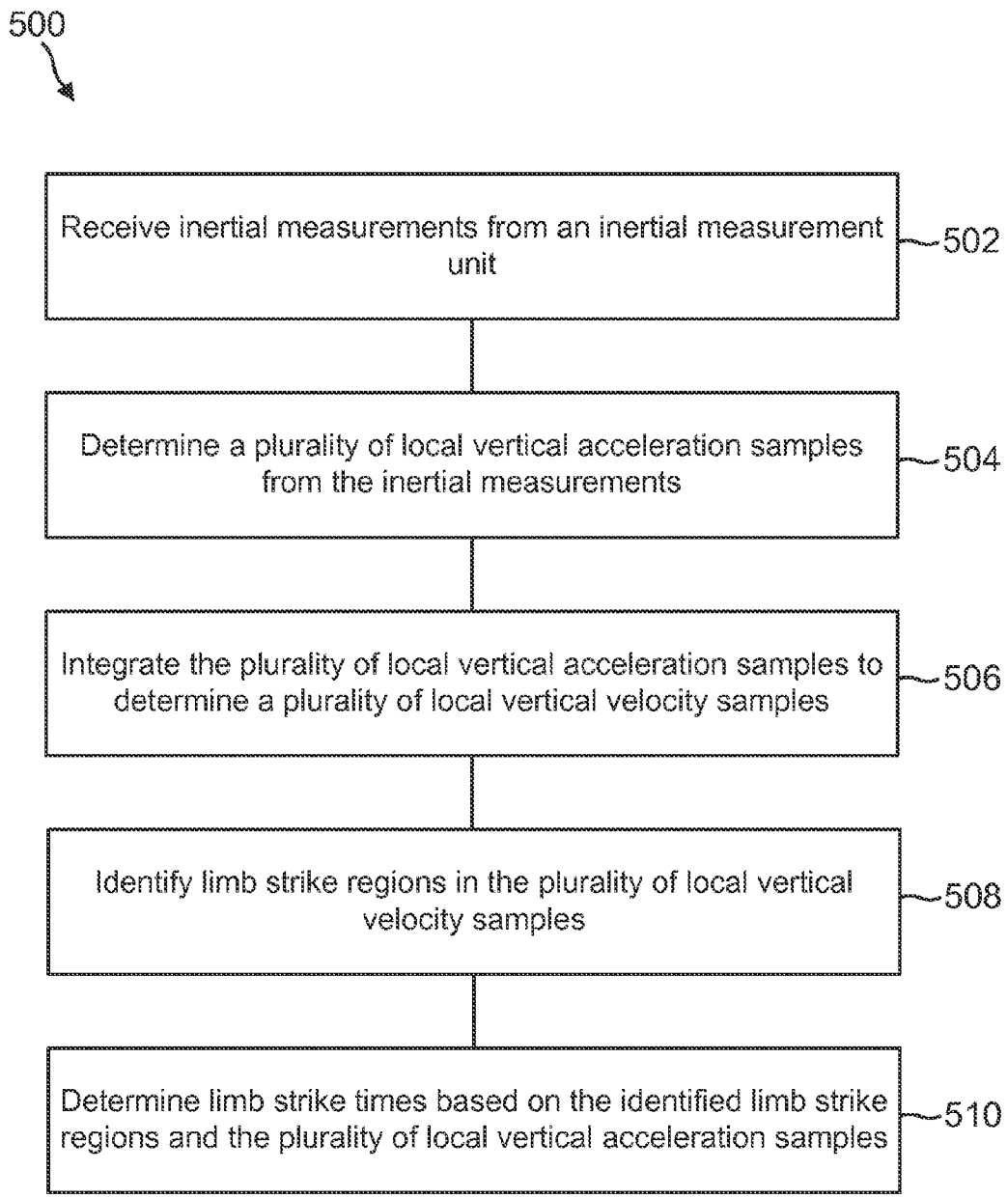
FIG. 5 is a flow diagram of a method for detecting limb strikes in one embodiment described in the present disclosure.

FIG. 5 is a flow diagram of an exemplary method 500 for detecting limb strikes. Method 500 proceeds at 502, where inertial measurements are received from an inertial measurement unit. For example, a user is wearing a personal navigation system that includes an inertial measurement unit that provides inertial measurements of acceleration and rotation about three different orthogonal axes. The personal navigation system includes a processor that receives the inertial measurements from the inertial measurement unit. When the inertial measurements are received, the method 500 proceeds at 504, where a plurality of local vertical acceleration samples from the inertial measurements are determined. For example, to determine the plurality of local vertical acceleration samples, the processor receives the inertial measurements and determines the components of acceleration that are along the local vertical axis.

In certain embodiments, method 500 proceeds at 506, where the plurality of local vertical acceleration samples is integrated to determine a plurality of local vertical velocity samples. Further, method 500 proceeds at 508, where limb strike regions are identified in the plurality of local vertical velocity samples. For example, the processor calculates the average local vertical velocity for a finite number of samples within a sliding window of samples. The processor then identifies the samples within the sliding window that have local vertical velocities that are less than the average local vertical velocity for the sliding window as the limb strike regions. Method 500 then proceeds at 510, where limb strike times are determined based on the identified limb strike regions and the plurality of local vertical acceleration samples. For example, the processor identifies a local vertical acceleration sample within the limb strike region that is approximately equal to the local gravitational acceleration. When there is not a local vertical acceleration sample approximately equal to the local gravitational acceleration, the processor interpolates the data samples to find a location on the interpolation that is equal to the local gravitational acceleration.

Example Embodiments

Example 1 includes a system for detecting limb strikes, the system comprising: an inertial measurement unit configured to provide inertial measurements; and a processing unit configured to receive the inertial measurements from the inertial measurement unit, wherein computer readable instructions direct the processing unit to: determine a plurality of local vertical acceleration samples from the inertial measurements, wherein each local vertical acceleration sample in the plurality of local vertical acceleration samples defines a component of acceleration along the local vertical axis and an associated time; integrate the plurality of local vertical acceleration samples to determine a plurality of local vertical velocity samples; identify limb strike regions, where limb strikes occur, from the plurality of local vertical velocity samples, wherein a limb strike region is associated with at least one local vertical velocity sample in the plurality of local vertical velocity samples; and determine limb strike times based on the identified limb strike regions and the plurality of local vertical acceleration samples.

Example 2 includes the system of Example 1, wherein the processing unit identifies the limb strike regions within a sliding window of local vertical velocity samples in the plurality of local vertical velocity samples.

Example 3 includes the system of Example 2, wherein the processing unit further identifies the limb strike regions by: calculating an average local vertical velocity for the sliding window of local vertical velocity samples; identifying consecutive samples that have a local vertical velocity that is less than the average local vertical velocity as the limb strike regions.

Example 4 includes the system of any of Examples 2-3, wherein the processing unit further determines whether the plurality of local vertical velocity samples is associated with a limb strike.

Example 5 includes the system of Example 4, wherein the processing unit determines whether the plurality of local vertical velocity samples is associated with a limb strike by: identifying a largest sample in the sliding window of local vertical velocity samples having the largest magnitude of local vertical velocity; identifying a smallest sample in the sliding window of local vertical velocity samples having the smallest magnitude of local vertical velocity; calculating a difference between magnitude of the largest sample and the smallest sample; and determining whether a limb strike occurred based on a comparison of the difference and a velocity range threshold.

Example 6 includes the system of Example 5, wherein the velocity range threshold is based on an expected gait for the user.

Example 7 includes the system of any of Examples 5-6, wherein, if the difference is less than the predefined threshold, the processing unit does not identify the limb strike regions where limb strikes occur.

Example 8 includes the system of any of Examples 1-7, wherein the processing unit is configured to determine limb strike times by: identifying a local vertical acceleration sample associated with the at least one vertical velocity sample in an identified limb strike region that is closest in magnitude to gravitational acceleration; defining the time associated with the local vertical acceleration sample as the limb strike time.

Example 9 includes the system of any of Examples 1-8, wherein the processing unit is configured to determine limb strike times by: defining a curve by interpolating between at least one local vertical acceleration sample associated with the at least one vertical velocity sample in an identified limb strike region; identifying a point on the curve that is closest in magnitude to gravitational acceleration; and defining the time associated with the point as the limb strike time.

Example 10 includes a method for detecting limb strikes, the method comprising: receiving inertial measurements from an inertial measurement unit; determining a plurality of local vertical acceleration samples from the inertial measurements, wherein each local vertical acceleration sample in the plurality of local vertical acceleration samples defines a component of acceleration along the local vertical axis at a defined time; integrating the plurality of local vertical acceleration samples to determine a plurality of local vertical velocity samples; identify limb strike regions within sliding windows of local vertical velocity samples in the plurality of local vertical velocity samples where limb strikes occur, wherein a limb strike region is associated with at least one local vertical velocity sample in the plurality of local vertical velocity samples; and determine limb strike times based on the identified limb strike regions and the plurality of local vertical acceleration samples.

Example 11 includes the method of Example 10, wherein identifying the limb strike regions comprises: calculating an average local vertical velocity for the sliding window of local vertical velocity samples; identifying consecutive samples that have a local vertical velocity that are less than the average local vertical velocity as the limb strike regions.

Example 12 includes the method of any of Examples 10-11, wherein identifying limb strike regions comprises: identifying a largest sample in the sliding window of local vertical velocity samples having the largest magnitude of local vertical velocity; identifying a smallest sample in the sliding window of local vertical velocity samples having the smallest magnitude of local vertical velocity; calculating a difference between magnitude of the largest sample and the smallest sample; and determining whether a limb strike occurred based on a comparison of the difference and a predefined threshold.

Example 13 includes the method of any of Examples 10-12, wherein determining limb strike times further comprises: identifying a local vertical acceleration sample associated with the at least one vertical velocity sample in an identified limb strike region that is closest in magnitude to gravitational acceleration; defining the time associated with the local vertical acceleration sample as the limb strike time.

Example 14 includes the method of any of Examples 10-13, wherein determining limb strike times further comprises: defining a curve by interpolating between at least one local vertical acceleration sample associated with the at least one vertical velocity sample in an identified limb strike region; identifying a point on the curve that is closest in magnitude to gravitational acceleration; and defining the time associated with the point as the limb strike time.

Example 15 includes the method of any of Examples 10-14, further comprising: determining a horizontal displacement based on the limb strike times and a motion model; and calculating a horizontal position based on the plurality of local vertical acceleration samples and the horizontal displacement.

Example 16 includes the method of Example 15, further comprising compensating for accumulated errors in the inertial measurements based on the calculated horizontal position.

Example 17 includes a personal navigation system, the system comprising: an inertial measurement unit configured to provide inertial measurements; and a processing unit configured to receive the inertial measurements from the inertial measurement unit, wherein computer readable instructions direct the processing unit to: determine a plurality of local vertical acceleration samples from the inertial measurements, wherein each local vertical acceleration sample in the plurality of local vertical acceleration samples defines a component of acceleration along the local vertical axis at a defined time; integrate the plurality of local vertical acceleration samples to determine a plurality of local vertical velocity samples; identify limb strike regions where limb strikes occur from the plurality of local vertical velocity samples, wherein a limb strike region is associated with at least one local vertical velocity sample in the plurality of local vertical velocity samples; determine limb strike times based on the identified limb strike regions and the plurality of local vertical acceleration samples, wherein a limb strike time occurs when local vertical acceleration is approximately equal to gravitational acceleration; determine horizontal position based on the limb strikes times and a motion model; and use the horizontal position to compensate for errors that occur in the inertial measurements.

Example 18 includes the personal navigation system of Example 17, wherein the processing unit is configured to determine the horizontal position by: determining horizontal displacement by using the limb strike times as inputs to the motion model; and calculating the horizontal position by using the horizontal displacement and the plurality of local vertical acceleration samples.

Example 19 includes the personal navigation system of any of Examples 17-18, wherein the processing unit identifies the limb strike regions within a sliding window of local vertical velocity samples in the plurality of local vertical velocity samples.

Example 20 includes the personal navigation system of Example 19, wherein the processing unit is further configured to: identify a largest sample in the sliding window of local vertical velocity samples having the largest magnitude of local vertical velocity; identify a smallest sample in the sliding window of local vertical velocity samples having the smallest magnitude of local vertical velocity; calculate a difference between magnitude of the largest sample and the smallest sample; and determine whether a limb strike occurred based on a comparison of the difference and a predefined threshold.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system for detecting limb strikes, the system comprising:
    an inertial measurement unit configured to provide inertial measurements; and
    a processing unit configured to receive the inertial measurements from the inertial measurement unit, wherein computer readable instructions direct the processing unit to:
        determine a plurality of local vertical acceleration samples from the inertial measurements, wherein each local vertical acceleration sample in the plurality of local vertical acceleration samples defines a component of acceleration along the local vertical axis and an associated time;

integrate the plurality of local vertical acceleration samples to determine a plurality of local vertical velocity samples;

identify limb strike regions, where limb strikes occur, from the plurality of local vertical velocity samples, wherein a limb strike region is associated with at least one local vertical velocity sample in the plurality of local vertical velocity samples; and determine limb strike times based on the identified limb strike regions and the plurality of local vertical acceleration samples wherein a limb strike time occurs when local vertical acceleration is approximately equal to gravitational acceleration.

2. The system of claim 1, wherein the processing unit identifies the limb strike regions within a sliding window of local vertical velocity samples in the plurality of local vertical velocity samples.

3. The system of claim 2, wherein the processing unit further identifies the limb strike regions by:
calculating an average local vertical velocity for the sliding window of local vertical velocity samples;
identifying consecutive samples that have a local vertical velocity that is less than the average local vertical velocity as the limb strike regions.

4. The system of claim 2, wherein the processing unit further determines whether the plurality of local vertical velocity samples is associated with a limb strike.

5. The system of claim 4, wherein the processing unit determines whether the plurality of local vertical velocity samples is associated with a limb strike by:
identifying a largest sample in the sliding window of local vertical velocity samples having the largest magnitude of local vertical velocity;
identifying a smallest sample in the sliding window of local vertical velocity samples having the smallest magnitude of local vertical velocity;
calculating a difference between magnitude of the largest sample and the smallest sample; and
determining whether a limb strike occurred based on a comparison of the difference and a velocity range threshold.

6. The system of claim 5, wherein the velocity range threshold is based on an expected gait for the user.

7. The system of claim 5, wherein, if the difference is less than the predefined threshold, the processing unit does not identify the limb strike regions where limb strikes occur.

8. The system of claim 1, wherein the processing unit is configured to determine limb strike times by:
defining a curve by interpolating between two samples of the at least one local vertical acceleration sample associated with the at least one vertical velocity sample in an identified limb strike region;
identifying a point on the curve that is approximately equal to gravitational acceleration; and
defining the time associated with the point as the limb strike time.

9. A method for detecting limb strikes, the method comprising:
receiving inertial measurements from an inertial measurement unit;
determining a plurality of local vertical acceleration samples from the inertial measurements, wherein each local vertical acceleration sample in the plurality of local vertical acceleration samples defines a component of acceleration along the local vertical axis at a defined time;

integrating the plurality of local vertical acceleration samples to determine a plurality of local vertical velocity samples;

identify limb strike regions within sliding windows of local vertical velocity samples in the plurality of local vertical velocity samples where limb strikes occur, wherein a limb strike region is associated with at least one local vertical velocity sample in the plurality of local vertical velocity samples; and determine limb strike times based on the identified limb strike regions and the plurality of local vertical acceleration samples wherein a limb strike time occurs when local vertical acceleration is approximately equal to gravitational acceleration.

10. The method of claim 9, wherein identifying the limb strike regions comprises:
calculating an average local vertical velocity for the sliding window of local vertical velocity samples;
identifying consecutive samples that have a local vertical velocity that are less than the average local vertical velocity as the limb strike regions.

11. The method of claim 9, wherein identifying limb strike regions comprises:
identifying a largest sample in the sliding window of local vertical velocity samples having the largest magnitude of local vertical velocity;
identifying a smallest sample in the sliding window of local vertical velocity samples having the smallest magnitude of local vertical velocity;
calculating a difference between magnitude of the largest sample and the smallest sample; and
determining whether a limb strike occurred based on a comparison of the difference and a predefined threshold.

12. The method of claim 9, wherein determining limb strike times further comprises:
defining a curve by interpolating between two samples of the at least one local vertical acceleration sample associated with the at least one vertical velocity sample in an identified limb strike region;
identifying a point on the curve that is approximately equal to gravitational acceleration; and
defining the time associated with the point as the limb strike time.

13. The method of claim 9, further comprising:
determining a horizontal displacement based on the limb strike times and a motion model; and
calculating a horizontal position based on the plurality of local vertical acceleration samples and the horizontal displacement.

14. The method of claim 13, further comprising compensating for accumulated errors in the inertial measurements based on the calculated horizontal position.

15. A personal navigation system, the system comprising:
an inertial measurement unit configured to provide inertial measurements; and
a processing unit configured to receive the inertial measurements from the inertial measurement unit, wherein computer readable instructions direct the processing unit to:
determine a plurality of local vertical acceleration samples from the inertial measurements, wherein each local vertical acceleration sample in the plurality of local vertical acceleration samples defines a component of acceleration along the local vertical axis at a defined time;

integrate the plurality of local vertical acceleration samples to determine a plurality of local vertical velocity samples;

identify limb strike regions where limb strikes occur from the plurality of local vertical velocity samples, wherein a limb strike region is associated with at least one local vertical velocity sample in the plurality of local vertical velocity samples;

determine limb strike times based on the identified limb strike regions and the plurality of local vertical acceleration samples, wherein a limb strike time occurs when local vertical acceleration is approximately equal to gravitational acceleration;

determine horizontal position based on the limb strikes times and a motion model; and use the horizontal position to compensate for errors that occur in the inertial measurements.

16. The personal navigation system of claim 15, wherein the processing unit is configured to determine the horizontal position by:

determining horizontal displacement by using the limb strike times as inputs to the motion model; and calculating the horizontal position by using the horizontal displacement and the plurality of local vertical acceleration samples.

17. The personal navigation system of claim 15, wherein the processing unit identifies the limb strike regions within a sliding window of local vertical velocity samples in the plurality of local vertical velocity samples.

18. The personal navigation system of claim 17, wherein the processing unit is further configured to:

identify a largest sample in the sliding window of local vertical velocity samples having the largest magnitude of local vertical velocity;

identify a smallest sample in the sliding window of local vertical velocity samples having the smallest magnitude of local vertical velocity;

calculate a difference between magnitude of the largest sample and the smallest sample; and determine whether a limb strike occurred based on a comparison of the difference and a predefined threshold.

* * * * *